(12) United States Patent
Rousseau

(10) Patent No.: US 11,953,421 B2
(45) Date of Patent: Apr. 9, 2024

(54) METHOD FOR ANALYZING A BIOLOGICAL SAMPLE CONTAINING BIOLOGICAL CELLS, AND ANALYSIS APPARATUS FOR IMPLEMENTING THE ANALYSIS METHOD

(71) Applicant: DIAGNOSTICA STAGO, Asnieres-sur-Seine (FR)

(72) Inventor: Alain Rousseau, Paris (FR)

(73) Assignee: DIAGNOSTICA STAGO, Asnieres-sur-Seine (FR)

( * ) Notice: Subject to any disclaimer, the term of this patent is extended or adjusted under 35 U.S.C. 154(b) by 753 days.

(21) Appl. No.: 16/978,080

(22) PCT Filed: Mar. 4, 2019

(86) PCT No.: PCT/FR2019/050481
§ 371 (c)(1),
(2) Date: Sep. 3, 2020

(87) PCT Pub. No.: WO2019/170993
PCT Pub. Date: Sep. 12, 2019

(65) Prior Publication Data
US 2020/0393356 A1    Dec. 17, 2020

(30) Foreign Application Priority Data
Mar. 7, 2018 (FR) ..................... 18/51958

(51) Int. Cl.
*G01N 15/14* (2006.01)
*G01N 15/10* (2006.01)
*G01N 15/1429* (2024.01)

(52) U.S. Cl.
CPC ..... *G01N 15/1475* (2013.01); *G01N 15/1429* (2013.01); *G01N 2015/1006* (2013.01); *G01N 2015/1037* (2013.01)

(58) Field of Classification Search
CPC ........... G01N 15/1475; G01N 15/1429; G01N 2015/1006; G01N 2015/1037;
(Continued)

(56) References Cited

U.S. PATENT DOCUMENTS 5,605,805 A    2/1997  Verwer et al.
8,008,029 B2   8/2011  Lefevre
(Continued)

FOREIGN PATENT DOCUMENTS

CN    106018246 A    10/2016
CN    106548205 A     3/2017
(Continued)

OTHER PUBLICATIONS

English translation of Office Action dated Feb. 7, 2023; Japanese Application No. 2020-542396; 4 pages.
(Continued)

*Primary Examiner* — Siamak Harandi
(74) *Attorney, Agent, or Firm* — CANTOR COLBURN LLP

(57) ABSTRACT

The analysis method includes a step of measuring cytometry parameters for each biological cell contained in a biological sample; a step of determining, for each biological cell of the biological sample, a point in a N-dimensional space whose coordinates are defined depending on the cytometry parameters measured for the corresponding biological cell, where N is an integer greater than or equal to 3; a step of automatic clustering of the points into different cell clusters depending on the measured cytometry parameters, so as to define a sample cluster file; and a step of comparing the sample cluster files with reference cluster files, each of the reference cluster files being defined from cytometry parameters of a respective pathological or abnormal biological sample.

17 Claims, 4 Drawing Sheets

(58) Field of Classification Search
CPC .............. G01N 2015/0065; G01N 2015/1477; G01N 2035/009; G01N 15/1459; G01N 15/14

See application file for complete search history.

(56) References Cited

U.S. PATENT DOCUMENTS

| | | | |
|---|---|---|---|
| 10,481,072 | B2 | 11/2019 | Wu et al. |
| 11,105,742 | B2 | 8/2021 | Ye et al. |
| 2006/0192940 | A1 | 8/2006 | Phi-Wilson |
| 2008/0172185 | A1 | 7/2008 | Yi et al. |
| 2010/0204973 | A1 | 8/2010 | Parkinson et al. |
| 2014/0120550 | A1 | 4/2014 | Baranov |
| 2014/0221247 | A1* | 8/2014 | Loken .................. G01N 33/574 506/10 |
| 2016/0169786 | A1 | 6/2016 | Albitar et al. |

FOREIGN PATENT DOCUMENTS

| | | |
|---|---|---|
| CN | 106687810 A | 5/2017 |
| JP | 2002207035 A | 7/2002 |
| JP | 2008507966 A | 3/2008 |
| JP | 2008533440 A | 8/2008 |
| JP | 2014520252 A | 8/2014 |
| JP | 2018505392 A | 2/2018 |
| RU | 2636352 C2 | 11/2017 |
| WO | 2006083969 A2 | 8/2006 |

OTHER PUBLICATIONS

English translation of Office Action dated Jan. 27, 2023; Russian Application No. 2020124003; 1 page.
Office Action dated Feb. 7, 2023; Japanese Application No. 2020-542396; 3 pages (non-English).
Office Action dated Jan. 27, 2023; Russian Application No. 2020124003; 5 pages (non-English).
English Translation to International Search Report for Application No. PCT/FR2019/050481.
International Search Report for Application No. PCT/FR2019/050481.
Written Opinion for Application No. PCT/FR2019/050481.
Office Action dated Sep. 28, 2022; Russian Application No. 2020124003, Filed: Mar. 4, 2019; 6 pages (non-English).
English Summary of Office Action dated Sep. 28, 2022; Russian Application No. 2020124003, Filed: Mar. 4, 2019; 1 page.
Search Report dated Sep. 27, 2022; Russian Application No. 2020124003, Filed: Mar. 4, 2019; 2 pages.
Chinese Office Action dated Mar. 29, 2023; Chinese Application No. 201980017554.3; 12 pages (non-English).
Chinese Office Action dated Mar. 29, 2023; Chinese Application No. 201980017554.3; 4 pages (English summary).

* cited by examiner

METHOD FOR ANALYZING A BIOLOGICAL SAMPLE CONTAINING BIOLOGICAL CELLS, AND ANALYSIS APPARATUS FOR IMPLEMENTING THE ANALYSIS METHOD

CROSS REFERENCE TO RELATED APPLICATIONS

This application is a National Stage of PCT Application No. PCT/FR2019/050481 filed on Mar. 4, 2019, which claims priority to French Patent Application No. 18/51958 filed on Mar. 7, 2018, the contents each of which are incorporated herein by reference thereto.

TECHNICAL FIELD

The present invention concerns a method for analyzing a biological sample containing biological cells and in particular blood cells, and an analysis apparatus adapted for the implementation of such an analysis method.

BACKGROUND

The cells which circulate in the blood comprise non-nucleated cells which are red blood cells or erythrocytes (about 5 million per $mm^3$ of normal blood), the platelets (about 300,000 per $mm^3$), and comprise nucleated cells, the leukocytes (about 10,000 per $mm^3$). The blood may contain other nucleated cells, such as erythroblasts which are immature red blood cells or other rarer cells. Each cell type constitutes what is also called a population.

Other biological fluids contain blood cells like cerebrospinal fluid or urine. Subsequently, it comes to a biological sample but this is not limited to a blood sample but to all biological fluids containing blood cells.

The conventional hematology analyzers using the flow cytometry or not, are intended to carry out the Complete Blood Count and to deliver qualitative information when quantitative anomalies are detected by cell type.

Cytometry equipment specialized in immunohematology allow, thanks to more sophisticated techniques and the implementation of specific reagents, to target hematological pathologies which can affect all cell types.

It is recalled that flow cytometry consists in carrying out at least one hydrodynamic focusing and in passing the blood cells one by one through a measurement device which, according to what is implemented, produces a certain number of physical measurements for each cell. So that the measurements are made distinctly, the cells should be separated and scroll at speeds allowing the measurements and their acquisition. In addition, there must be sufficient counts to allow proper statistical assessments of each population. To do this, the blood sample is not analyzed pure but diluted. In addition, taking into account amounts of red blood cells which are thousand times higher than leukocytes, the sample, to carry out an analysis which is statistically representative of the leukocyte populations, must pass for a time of several minutes in the cytometer. The other solution, in order to reduce the time of passage of the sample in the cytometer by a factor of ten, consists in carrying out, in addition to a dilution of the sample, a lysis which selectively destroys the red blood cells in order to have a sample sufficiently concentrated in leukocytes and thus have statistically correct counts for these populations.

There are two types of produced flow cytometry parameters:

either of a physical or morphological nature: measurement of the volume of the cells by impedance (Coulter effect), measurements of optical absorption, diffraction at different angles generated by the passage of each cell in a laser beam and measurement of fluorescence of nucleic acids made fluorescent by one or more fluorochromes previously brought into the presence of the cells. These data allow characterizing each cell by its volume, by its optical absorption which depends on its surface and its content, by its internal complexity, by the nature of its surface, its composition and by its nucleic activity for the nucleated cells;

either of an immunological nature (immunohematology): the sample is placed in the presence of reagents containing antibodies conjugated to a fluorochrome and specific for receptors expressed on the surface of certain cells. The passage of the cells in one or several laser beam(s) generates signals proportional to the markers of cell surfaces and thus allows characterizing the cells.

A method for analyzing a biological sample containing biological cells comprises, in a known manner, the following steps:

passage of the biological cells of the biological sample to be analyzed into a measuring cell of a flow cytometer, measurement of N cytometry parameters, such as morphological or immunological cytometry, for each biological cell contained in the biological sample to be analyzed, determination, for each biological cell of the biological sample to be analyzed, of a point in a N-dimensional space whose coordinates are defined depending on the cytometry parameters measured for the corresponding biological cell, where N is an integer greater than or equal to 2, for equipment whose function is limited to the complete blood count, clustering of the points into different cell clusters depending on the measured cytometry parameters, so as to define a sample cluster file, the clustering step then being carried out using automatic zoning methods, statistical methods or else point density methods, for more sophisticated equipment performing hemato-immunological measurements, either visual analysis by an operator, such as a hematologist, specialist in cytometry of representations of the points determined on two measurement axes and clustering of the points into different cell clusters according to the clustering criteria by thresholds or else by zones selected by the operator, or automatic clustering of the points into different cell clusters depending on the measured cytometry parameters, so as to define a sample cluster file, and computer analysis of the sample cluster file and in particular of the different cell clusters, the analysis step aiming at qualifying and quantifying the cell clusters having common characteristics, identification by the operator of one or several anomaly (anomalies) in the sample cluster file compared to normal samples.

From the identified anomalies, for example by crossing numerical thresholds (abnormally low or abnormally high number of a cell type), and from his experience in medical cytometry, the operator may be capable either to directly determine the pathology of the patient whose biological sample has been analyzed and the associated treatment, or to issue a prognosis concerning the possible pathology of the patient whose biological sample has been analyzed and to consider complementary blood tests in order to confirm his prognosis.

However, the clustering, analysis and identification steps are quite subjective and strongly depend on the operators experience in cytometry, such that a diagnosis or prognosis stated for a patient by an operator depends on the operator's qualification and experience. however, these steps are laborious and time consuming. The processing rates of these equipment are low compared to those of the hematology counters.

In addition, cytometry in immunohematology using antibodies to characterize the cells in a very specific manner, uses expensive products, which makes cytometry difficult to establish itself as a routine method.

Finally, this type of analysis aiming at clustering the cells having common characteristics is intended to enumerate and qualify the populations to qualify the anomalies thereof by type of population. This type of analysis is therefore not interested in the whole data like in an overall picture of the sample of the patient.

BRIEF SUMMARY

The present invention aims at overcoming these drawbacks and introducing a new paradigm by using the data collected by the flow cytometer to characterize the biological cells, automatically cluster them by cluster, identify and qualify the populations of the clusters but also consider the whole data as an image representation of the biological sample and also to process this image relative to reference images.

The technical problem underlying the invention consists in particular in providing a method for analyzing a biological sample containing biological cells which optimizes the processing of the data from the measurements, which ensures a reproducibility of the obtained results, while ensuring that this process is compatible with high-speed equipment and does not require any particular skill or time for the operator.

To this end, the present invention concerns a method for analyzing a biological sample containing biological cells including blood cells, the analysis method comprising the following steps:

passage of the biological cells of the biological sample to be analyzed into a measuring cell of a flow cytometer,
measurement of N cytometry parameters of the biological cells contained in a biological sample to be analyzed,
determination, for each biological cell of the biological sample to be analyzed, of a point in a N-dimensional space whose coordinates are defined depending on the cytometry parameters measured for the corresponding biological cell, where N is an integer greater than or equal to 3,
automatic clustering of the determined points into different cell clusters depending on the cytometry parameters measured for each biological cell of the biological sample to be analyzed, so as to define a sample cluster file, the sample cluster file advantageously being a computer file digitally describing the biological sample to be analyzed and preferably being written according to a standard,
identification of the cell populations defined by the different cell clusters of the sample cluster file,
counting of the points of each cell cluster of the sample cluster file,
comparison of the sample cluster file with reference cluster files, each of the reference cluster files being defined from cytometry parameters of a respective pathological or abnormal biological sample.

Such a configuration of the analysis method according to the present invention allows automatically identifying a possible resemblance between the sample cluster file, which digitally describes the biological sample to be analyzed, and one or more reference cluster file(s), and therefore improving the relevance of the indications returned to an operator (via for example specific indications or alarms added to the returned measurements) at the end of the comparison step and thus helping to give the operator the most relevant recommendations possible in order to speed up the diagnosis. In particular, the analysis method according to the present invention allows the laboratory to save time in the decisions to be taken, to specify the scope of subsequent investigations and to direct, if necessary, the hematologists more quickly towards complementary analyzes which can be blood smears followed by microscopic analysis or immunoassays using simple, inexpensive and robust means. It is not a question of substituting this process for the analysis of image of the blood smear but to draw the maximum of information possible from the digital blood count and this without additional cost neither material, nor in time.

The analysis method according to the present invention consists more particularly in carrying out, based on cytometric measurements, a comparative morphological analysis of the considered biological sample, with reference biological samples, and more specifically a comparative morphological analysis of the sample cluster file, which is established from the analyzed biological sample, with reference cluster files established from pathological or abnormal biological samples whose clinical data are known.

The analysis method according to the present invention is therefore based on carrying out reference files obtained from samples whose pathology is known. It's actually a learning carried out by compilation of clinical trials and which can progress depending on new reference files corresponding to new anomalies or pathologies.

Each learning version is not specific to each machine but is validated and applies to all machines of the same type which operate with the reagents of identical compositions for the preparations (dilution, lysis, fluorescent labeling).

The cells which circulate in the blood result from what is produced by the hematopoiesis, by the detachment of endothelial cells and by the infections by allogeneic agents such as bacteria or parasites such as plasmodium. The hematopoiesis produced in the bone marrow, on the one hand, leukocytes, that is to say polynuclears or neutrophil, eosinophil and basophil granulocytes, monocytes and lymphocytes, and on the other hand, erythrocytes and platelets. Each type of cell can be affected by different types of pathologies which can cause immature cells in the blood, such as for example, erythroblasts which are erythrocytes which are still provided with their nucleus or reticulocytes which no longer have a nucleus but still have a ribosomal and mitochondrial activity.

According to one embodiment of the invention, the measured cytometry parameters are physical measurements such as the volume of each biological cell, the optical absorption, the diffraction at large angles, the diffraction at small angles.

The analysis method may further have one or more of the following features, taken alone or in combination.

According to one embodiment of the invention, the biological cells to be analyzed can be blood cells, and more particularly blood cells which have been the subject of a preparation, either an isotonic dilution to preserve the cells and to be able to space them sufficiently in the cytometer and to measure, under the best conditions, each cytometry parameter, or a selective lysis operation which will eliminate the red blood cells which are approximately a thousand times more numerous than the white blood cells, this lysis operation having the effect of being able to identify and count the leukocytes in a shorter time but this also results in modifying, depending on the type of lysis, the volume and the optical response of the observed non-lysed cells.

In fact, the preferred embodiment of the invention uses two cytometers in parallel, a first in which the biological sample is only diluted and the second, which processes the lysed biological sample, more particularly to observe the nucleated cells. This allows collecting data in spaces with dimensions N>3 both for the lysed biological sample and for the non-lysed biological sample. This means that the non-nucleated cells which are erythrocytes and platelets are processed by the same types of algorithms as nucleated cells.

According to an embodiment of the invention, the clustering step is carried out by an automatic processing, according to specific algorithms, of the points determined by the N cytometry parameters corresponding to each biological cell of the biological sample to be analyzed. The different points can for example be clustered into different clusters of points according to statistical criteria or density criteria of these points in the N-dimensional space, so as to define a file which is digitally describing the biological sample to be analyzed by points representing each cell, grouped in clusters positioned in the N-dimensional space.

According to an embodiment of the invention, the analysis method comprises a step of sampling and digitizing a set of analog signals generated during the duration of the measurement step so as to define a first raw data file similar to a digital oscillogram for each of the N measurement channels, and a step of synchronization and grouping of the N digitized signal for each biological cell of the sample to be analyzed by a first level of computer processing.

According to an embodiment of the invention, the clustering step consists in clustering the determined points into different cell clusters using statistical methods or allowing isolating the clusters by spatial density analysis of the points representing the cells in the N-dimensional space.

According to one embodiment of the invention, each coordinate axis of the N-dimensional space corresponds to a respective cytometry parameter.

According to one embodiment of the invention, N is an integer greater than or equal to 4, and can for example be equal to 5.

According to one embodiment of the invention, the sample cluster file is in the FCS (Flow Cytometry Standard) format.

According to one embodiment of the invention, the analysis method further comprises a step of emitting an alarm message when the sample cluster file is at least partially identical or similar to a reference cluster file, and for example when predetermined cell clusters of the sample cluster file are identical or similar to predetermined cell clusters of the reference cluster file.

According to one embodiment of the invention, the emitted alarm message contains indications related to a pathology or an abnormality associated to the reference cluster file to which the sample cluster file is at least partially identical or similar. These arrangements allow communicating, to the operator, a probability of pathology associated to the analyzed biological sample, but does not in any case constitute a diagnosis of the pathology of which the patient, from whom the analyzed biological sample was taken, may be affected According to one embodiment of the invention, the analysis method further comprises a step of analyzing the sample cluster file so as to detect at least one possible anomaly in the sample cluster file.

According to one embodiment of the invention, the comparison step is carried out only when at least one anomaly is detected during the analysis step.

According to one embodiment of the invention, when at least one anomaly is detected during the analysis step, the alarm message emitted during the emission step also contains information relating to the at least one detected anomaly.

According to one embodiment of the invention, the analysis step comprises a step of analyzing, for each cell cluster of the sample cluster file, at least one morphological parameter of said cell cluster.

According to one embodiment of the invention, the at least one morphological parameter of each cell cluster of the sample cluster file may comprise the positioning of said cell cluster, the distribution of points of said cell cluster, the number of points of said cell cluster, and/or the presence or the absence of said cell cluster. Thus, the detection of an abnormal count of a cell cluster, of an abnormal relative positioning between different cell clusters or else of the presence of a cluster of cells relating to an abnormal cell population allows detecting an anomaly in the sample cluster file.

According to one embodiment of the invention, the analysis step comprises a step of detecting an anomaly if at least one morphological parameter of at least one cell cluster of the sample cluster file exceeds a respective predetermined threshold value.

According to one embodiment of the invention, the analysis step comprises the following steps:
  comparison, for each cell cluster of the sample cluster file, of the number of points clustered in said cell cluster with at least one respective predetermined threshold value,
  detection of an anomaly if the number of points clustered in at least one of the cell clusters is less and/or greater than the at least one respective predetermined threshold value.

According to one embodiment of the invention, the analysis step comprises the following steps:
  comparison, for each cell cluster of the sample cluster file, of the number of points clustered in said cell cluster with a respective predetermined lower threshold value or with a respective predetermined upper threshold value,
  detection of an anomaly if the number of points clustered in at least one of the cell clusters is less than the respective predetermined lower threshold value or greater than the respective predetermined upper threshold value.

According to one embodiment of the invention, the analysis step comprises the following steps:
  analysis of the distribution of the points in each cell cluster of the sample cluster file,
  detection of an anomaly if the distribution of the points in at least one of the cell clusters is not Gaussian.

According to one embodiment of the invention, the analysis step comprises the following steps:
analysis of the positioning of the cell clusters of the sample cluster file,
detection of an anomaly if at least two cell clusters of the sample cluster file are at least partially confused.

According to one embodiment of the invention, the analysis step comprises the following steps:
analysis of the cell clusters of the sample cluster file,
detection of an anomaly if the presence or absence of at least one predetermined cell cluster is detected.

According to one embodiment of the invention, the analysis step comprises the following steps:
analysis of the sample cluster file,
detection of an anomaly if the number of cell clusters is higher or lower than a predetermined reference value.

According to one embodiment of the invention, the analysis step comprises a step of searching for abnormal or atypical cell clusters, that is to say located outside the normal cell clusters, the abnormal or atypical cell clusters which may for example correspond to immature cells or parasites. The analysis method can further comprise a step of comparing these abnormal or atypical cell clusters with the reference files.

According one embodiment of the invention, the step of measuring cytometry parameters comprises at least one step of measuring cytometry parameters representative of the morphology and/or the structure of the biological cells of the biological sample to be analyzed.

According to one embodiment of the invention, the step of measuring cytometry parameters comprises at least one step of measuring, for each biological cell of the biological sample to be analyzed, at least one optical property of said biological cell.

According to one embodiment of the invention, the step of measuring cytometry parameters comprises at least one step of measuring, for each biological cell of the biological sample to be analyzed, at least one electrical and/or electromagnetic property of said biological cell.

According to one embodiment of the invention, the step of measuring cytometry parameters comprises a step of measuring an amount of light absorbed or re-emitted by each biological cell of the biological sample to be analyzed.

According to one embodiment of the invention, the step of measuring cytometry parameters comprises:
a step of measuring the intensity of a light beam scattered at small angles by each biological cell, and/or
a step of measuring the intensity of a light beam scattered at 90° by each biological cell, and/or
a step of measuring the intensity of a light beam scattered along an optical path of the incident light beam by each biological cell.

The light scattered by each biological cell provides information on the morphology and structure of said biological cell. In particular, the intensity of a light beam scattered at small angles, for example at angles less than 15°, advantageously equal to 4° and/or 9°, by each biological cell is substantially proportional to the size of said biological cell, while the intensity of a light beam scattered at 90° by each biological cell is proportional to the shape, the internal structure and the granularity of said biological cell. Furthermore, the intensity of a light beam in the optical axis of the incident light beam by each biological cell is proportional to the size and the viability of said biological cell. Such a measurement of diffusion along the optical path of the incident light beam corresponds to a measurement of the intensity of the light absorption of each biological cell.

Thus, the simultaneous use of these two or three aforementioned parameters (impedance measurement, optical absorption measurement, diffusion measurements at different angles) allows distinguishing, in a biological sample, for example platelets, erythrocytes, lymphocytes, monocytes and different populations of polymorphonuclear leukocytes.

The angle values communicated below are understood to be relative to the optical path of the incident light beam.

According to one embodiment of the invention, the step of measuring cytometry parameters comprises a step of measuring the intensity of at least one fluorescence beam emitted by each biological cell, for example at 90°.

According to one embodiment of the invention, the step of measuring cytometry parameters further comprises a step of measuring the variation in electrical impedance generated by the passage of the biological cells through a measurement chamber.

According to one embodiment of the invention, the step of measuring cytometry parameters includes the following steps:
emission of an incident light beam towards the biological cells passing through the measurement chamber such that the incident light beam crosses the path of the biological cells,
detection of at least one light beam from each biological cell passing through the measurement chamber.

According to one embodiment of the invention, the passage step includes at least one step of hydrodynamic sheathing of the biological cells passing through the measurement chamber.

According to one embodiment of the invention, the detection step comprises a step of simultaneous detection of at least one light beam scattered by each biological cell passing through the measurement chamber and at least one fluorescence beam emitted by each biological cell passing through the measurement chamber.

According to one embodiment of the invention, the detection step comprises a step of simultaneous detection of light beams scattered in at least two different directions by each biological cell passing through the measurement chamber and of at least two fluorescence beams emitted by each biological cell passing through the measurement chamber having at least two different wavelengths.

According to one embodiment of the invention, the analysis method comprises a step of determining the structure and/or the shape of said biological cells.

According to one embodiment of the invention, the analysis method comprises a step of determining the concentration of the biological cells and/or the distribution of the biological cells in the respective cell clusters.

According to one embodiment of the invention, the analysis method further comprises the following steps:
passage of the biological cells of a reference biological sample into a measuring cell of a flow cytometer,
measurement of N cytometry parameters for each biological cell contained in the reference biological sample,
determination, for each biological cell of the reference biological sample, of a point in a N-dimensional space whose coordinates are defined depending on the cytometry parameters measured for said biological cell of the reference biological sample, where N is an integer greater than or equal to 3,
automatic clustering of the determined points relating to the reference biological sample into different cell clusters depending on the cytometry parameters measured for each biological cell of the reference biological sample, so as to define a reference cluster file, repeating said passage, measurement, determination and clustering steps for a plurality of reference biological samples so as to define a plurality of reference cluster files.

According to one embodiment of the invention, the analysis method comprises, prior to the step of passage of the biological cells of the biological sample to be analyzed, a step of preparation of the biological sample to be analyzed. The preparation step includes for example a step of diluting the biological sample to be analyzed, for example using an isotonic diluent. The preparation step can also comprise, in addition to the dilution step, a step of selective lysis of at least some of the biological cells contained in the biological sample to be analyzed, and for example erythrocytes.

According to one embodiment of the invention, the preparation step comprises a step of labeling at least some of the biological cells contained in the biological sample to be analyzed, and more particularly the nucleic acids of at least some of the biological cells contained in the biological sample to be analyzed, with a fluorochrome, such as a fluorescent dye.

According to one embodiment of the invention, the analysis method includes a step of integrating the sample cluster file as a reference cluster file. Such an integration step is carried out in particular after a hematologist has identified the pathology relating to the biological sample to be analyzed and has associated indications relating to such a pathology with the sample cluster file.

According to one embodiment of the invention, the analysis method, and in particular the analysis step, comprises a step of comparing the sample cluster file with normal cluster files, each of the normal cluster files being defined from cytometry parameters of a respective normal biological sample. In the present description, the term «normal» biological sample, means a biological sample which is not pathological and which is not abnormal.

According to one embodiment of the invention, the preparation step comprises the addition, in the biological sample to be analyzed, of one or more reagent(s) containing antibodies specific for receptors located on the membranes of the biological cells. These antibodies are conjugated either to fluorescent tracers, or to particles which allow generating one or more specific signal(s) on each cell. Thus, the analysis method according to the invention allows adding, to the basic physical magnitudes digitally converted into cytometry parameters, immuno-hematological measurements on demand to be able to better specify or confirm a diagnosis.

The present invention further concerns an analysis apparatus comprising:

a flow cytometer comprising a measurement cell intended for the passage of biological cells of a biological sample to be analyzed and measuring means configured to measure cytometry parameters of the biological cells of the biological sample to be analyzed, and a processing unit configured to:

determine, for each biological cell of the biological sample to be analyzed, a point in a N-dimensional space whose coordinates are defined depending on the cytometry parameters measured for the corresponding biological cell, where N is an integer greater than or equal to 3, cluster the points into different cell clusters depending on the cytometry parameters measured for each biological cell of the biological sample to be analyzed, so as to define a sample cluster file, compare the sample cluster file with reference cluster files, each of the reference cluster files being defined from cytometry parameters of a respective pathological or abnormal biological sample.

According to one embodiment of the invention, the analysis apparatus is an analysis apparatus for in vitro diagnosis, such as a hematology device.

According to one embodiment of the invention, the measuring cell of the flow cytometer is inclined relative to the horizontal, and for example by an angle of about 45°.

BRIEF DESCRIPTION OF THE DRAWINGS

In any case, the invention will be clearly understood using the following description with reference to the appended schematic drawings representing, by way of non-limiting example, an embodiment of this flow cytometer.

FIGS. 6 and 7 are enlarged-scale views of details of FIG. 3.

DETAILED DESCRIPTION

Figure 1:
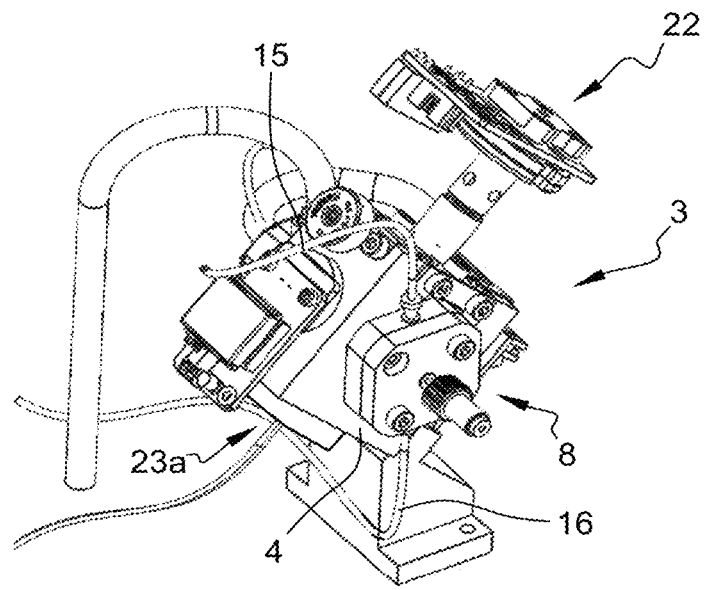
FIGS. 1 and 2 are perspective views of a flow cytometer belonging to a flow cytometer according to the present invention.
Figure 2:
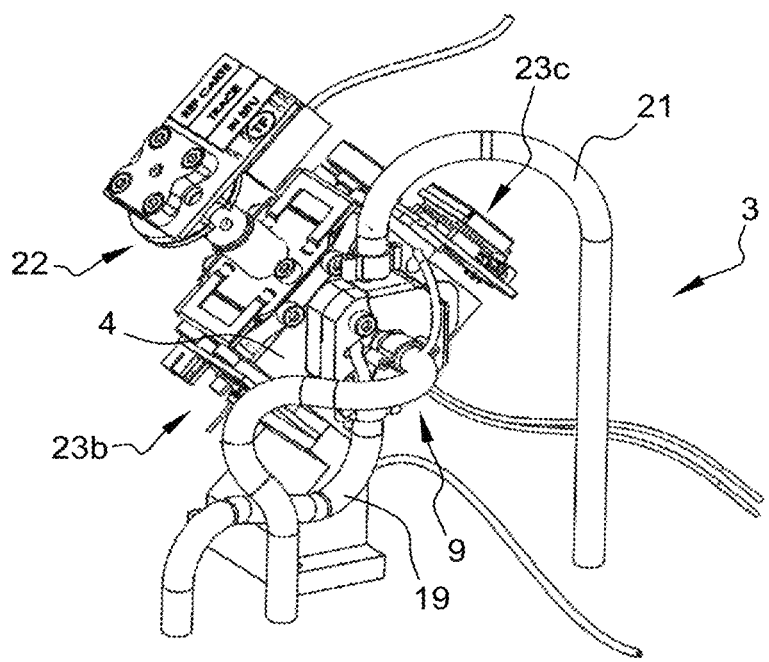

FIGS. 1 to 7 represent a flow cytometer 3, also called cytometric measurement head, belonging to an analysis apparatus 2 according to the present invention.

The flow cytometer 3 comprises a one-piece support 4 which may for example be a metal support. The support 4 is parallelepiped-shaped and delimits an internal receiving housing 5. The support 4 includes in particular six passage openings formed respectively on the six outer faces of the support 4.

The flow cytometer 3 further comprises a measuring cell 6 (shown more particularly in FIG. 4) which at least partially delimits a measurement chamber 7, an injection device 8 arranged to inject a flow of biological cells F into the measurement chamber 7, and a discharge device 9 arranged to discharge, outside the flow cytometer 3, the flow of biological cells F injected into the measurement chamber 7.

Figure 4:
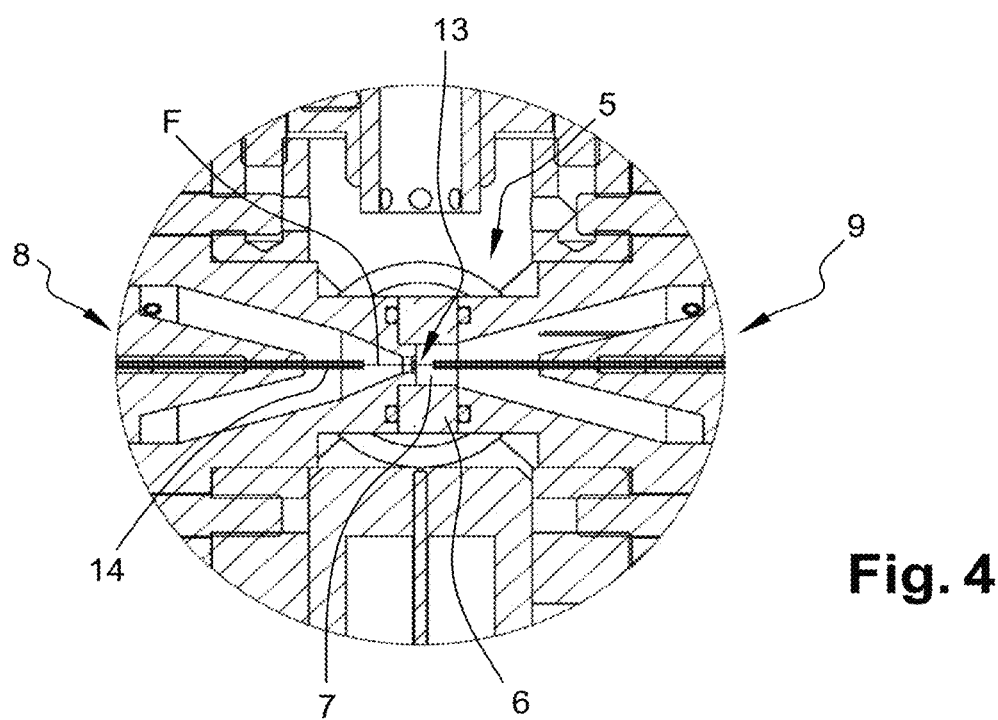
FIG. 4 is an enlarged view of a detail of FIG. 3.
Figure 5:
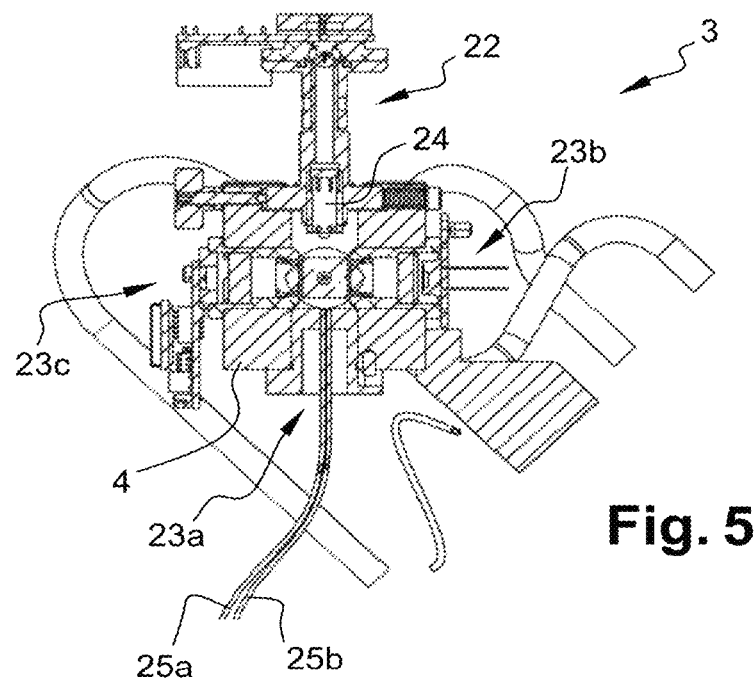
FIG. 5 is a cross-sectional view of the flow cytometer of FIG. 1.

As shown in FIG. 4, the measuring cell 6 is annular and is interposed in a sealed manner between the injection and discharge devices 8, 9. The measuring cell 6 is housed in the receiving housing 5 delimited by the support 4, and is fluidly isolated from the receiving housing 5. The measuring cell 6 is advantageously made of an material which is electrically insulating and transparent to light, and for example made of polymethyl methacrylate, glass or quartz to avoid autofluorescence.

The injection and discharge devices 8, 9 are fastened respectively on two opposite outer faces of the support 4, and for example on the opposite lateral outer faces of the support 4. However, the injection and discharge devices 8, 9 could also be fastened respectively on the two upper and lower outer faces of the support 4.

Figure 3:
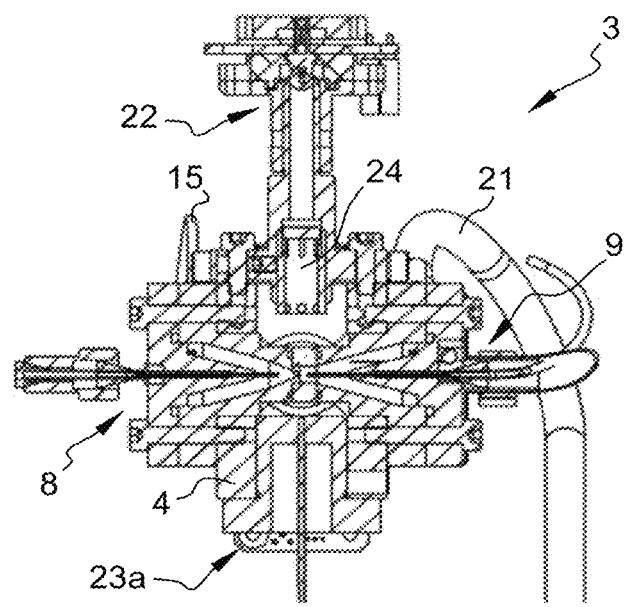
FIG. 3 is a cross-sectional view of the flow cytometer of FIG. 1.
Figure 6:
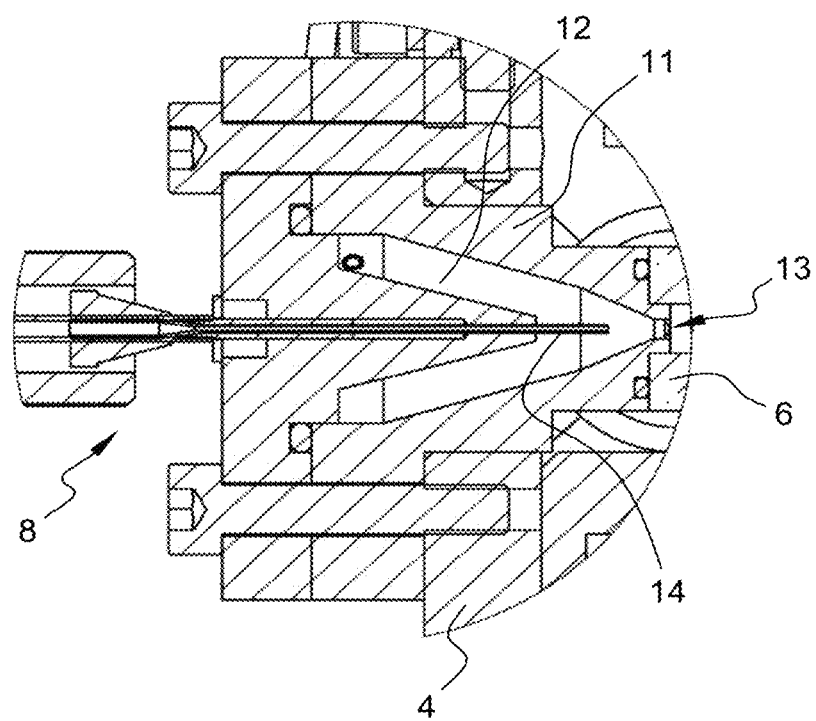
FIG. 6 is a sectional view along the line VI-VI of FIG. 2.

As shown more particularly in FIGS. 3 and 6, the injection device 8 comprises an injection nozzle 11 delimiting an inner chamber 12. The injection nozzle 11 is provided with an injection orifice 13 opening into the measurement chamber 7 and arranged to fluidly connect the inner chamber 12 to measurement chamber 7.

The injection device 8 further comprises a first tubular supply conduit 14 intended to supply the inner chamber 12 with a biological sample to be analyzed containing, in suspension, biological cells to be analyzed.

As shown in FIG. 1, the injection device 8 further includes a conveying conduit 15 fluidly connected to the inner chamber 12 and intended to convey the content of the inner chamber 12 to the outside of the flow cytometer 3. The conveying conduit 15 is more particularly intended to convey a rinsing fluid, introduced into the inner chamber 12, to the outside of the flow cytometer 3 via the first supply duct 14.

The injection device 8 further comprises a second supply conduit 16 intended to supply the inner chamber 12 with a sheathing fluid. The injection nozzle 11 and the second supply conduit 16 are configured such that the sheathing fluid introduced into the inner chamber 12 via the second supply conduit 16 is capable of hydrodynamically sheathing the biological sample introduced into the inner chamber 12 before the biological sample passes through the injection orifice 13.

Figure 7:
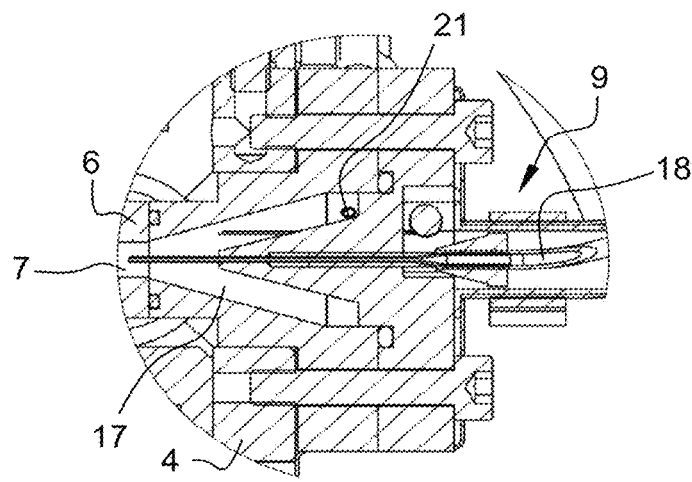

As shown in FIG. 7, the discharge device 9 delimits an inner chamber 17 opening into the measurement chamber 7 and further comprises a tubular discharge conduit 18 fluidly connected to the measurement chamber 7 and intended to discharge the flow of biological cells F injected into the measurement chamber 7 towards the outside of the flow cytometer 3. The discharge duct 18 partially extends into an inner chamber 17 and opens into the measurement chamber 7 opposite the injection orifice 13.

The discharge device 9 further comprises a third supply conduit 19 fluidly connected to the measurement chamber 7 and intended to supply the measurement chamber 7 with a sheathing fluid. The measurement chamber 7 and the third supply conduit 19 are configured such that the sheathing fluid introduced into the measurement chamber 7 via the third supply conduit 19 is capable of hydrodynamically sheath the flow of biological cells F flowing through the measurement chamber 7.

As shown in FIGS. 1 and 7, the discharge device 9 further includes a conveying conduit 21 fluidly connected to the measurement chamber 7 and intended to convey the contents of the measurement chamber 7 outside the flow cytometer 3. The conveying conduit 21 is more particularly intended to convey a rinsing fluid, introduced into the measurement chamber 7, outside the flow cytometer 3 via the third supply conduit 19.

The flow cytometer 3 further comprises measuring means configured to measure cytometry parameters of the biological cells to be analyzed, and in particular to measure the optical and electrical properties of the biological cells to be analyzed.

According to the embodiment represented in FIGS. 1 to 7, the measuring means include an emission device 22 arranged to emit an incident light beam in the direction of the measurement chamber 7 and capable of crossing, that is to say intersecting, the flow of biological cells F introduced into the measurement chamber 7, and several collection devices 23a, 23b, 23c angularly offset relative to the flow of biological cells F and arranged to collect light beams originating from the biological cells passing through the measurement chamber 7. Nevertheless, the measuring means could for example include several emission devices angularly offset relative to the flow of biological cells, and also a single or several collection device(s).

The emission and collection devices are mounted on the upper and lower outer faces of the support 4 and extend in a plane substantially perpendicular to the flow direction of the flow of biological cells F. The collection device 23a is for example disposed opposite to the emission device 22 relative to the measuring cell 6, while the collection devices 23b and 23c are disposed perpendicular to the emission device 22 relative to the measuring cell 6. However, according to a variant of the invention, the emission device 22 and the collection device 23a could be mounted on the lateral outer faces of the support 4.

The emission device 22 comprises a light source 24 arranged to generate the incident light beam. The light source 24 may for example be a laser source arranged to generate a laser beam.

According to the embodiment represented in FIGS. 1 to 7 and as follows more particularly from FIG. 1, the collection device 23a comprises a plurality of collection optical elements, and more particularly a central collection optical fiber 25a, and one or several peripheral collection optical fiber(s) 25b. For example, the central collection optical fiber 25a is intended to collect the light beams from the measurement chamber 7 along the optical path of the incident light beam, that is to say at 0°, and the peripheral collection optical fibers 25b are intended for some to collect the light beams from the measurement chamber 7 at an angle in the range of 4° and for others to collect light beams from the measurement chamber 7 at an angle in the range of 9°. The collection device 23a could however include a single peripheral collection optical fiber 25b.

The collection device 23b could for example comprise a single collection optical element, such as a central collection optical fiber, and the collection device 23c could for example also comprise a single collection optical element, such as a central collection optical fiber.

The measuring means further include a plurality of detection elements (not represented in the figures) each associated to a respective collection device 23a-23c. Each detection element is arranged to output a measurement signal determined depending on the light beams collected by the respective collection device. When each biological cell passes through the incident light beam, each measurement signal output by each detection element is for example proportional to the amount of light absorbed or re-emitted by said biological cell. Each detection element can for example be a photodetector, such as a photodiode or also a photomultiplier.

The measuring means further advantageously comprise an electrical impedance variation measurement device arranged to measure the variation in electrical impedance generated by the passage of biological cells to through the injection orifice 13. The electrical impedance variation measurement device comprises for example first and second electrodes (not represented in the figures) disposed respectively on either side of the orifice injection 13. The first and second electrodes are intended to be in electrical contact with the flow of biological cells F so as to establish an electric field through the injection orifice 13. According to a variant of the electrical impedance variation measurement device, the latter could comprise a single electrode disposed at least partially in the inner chamber 17, and the potential of the internal chamber 12 could be grounded, such that the electrical impedance variation measurement device is configured to measure an electrical impedance variation between the inner chamber 12 and the electrode placed in the inner chamber 17.

Such an electrical impedance variation measurement device allows counting the number of biological cells passing through the injection orifice 13, and also determining the size, and more specifically the volume of the biological cells. The operation of such an electrical impedance variation measurement device is known to those skilled in the art and is therefore not described in details. It should however be noted that the passage of each biological cell through the injection orifice 13 causes an electrical pulse proportional to the size or volume of said biological cell.

Figure 8:
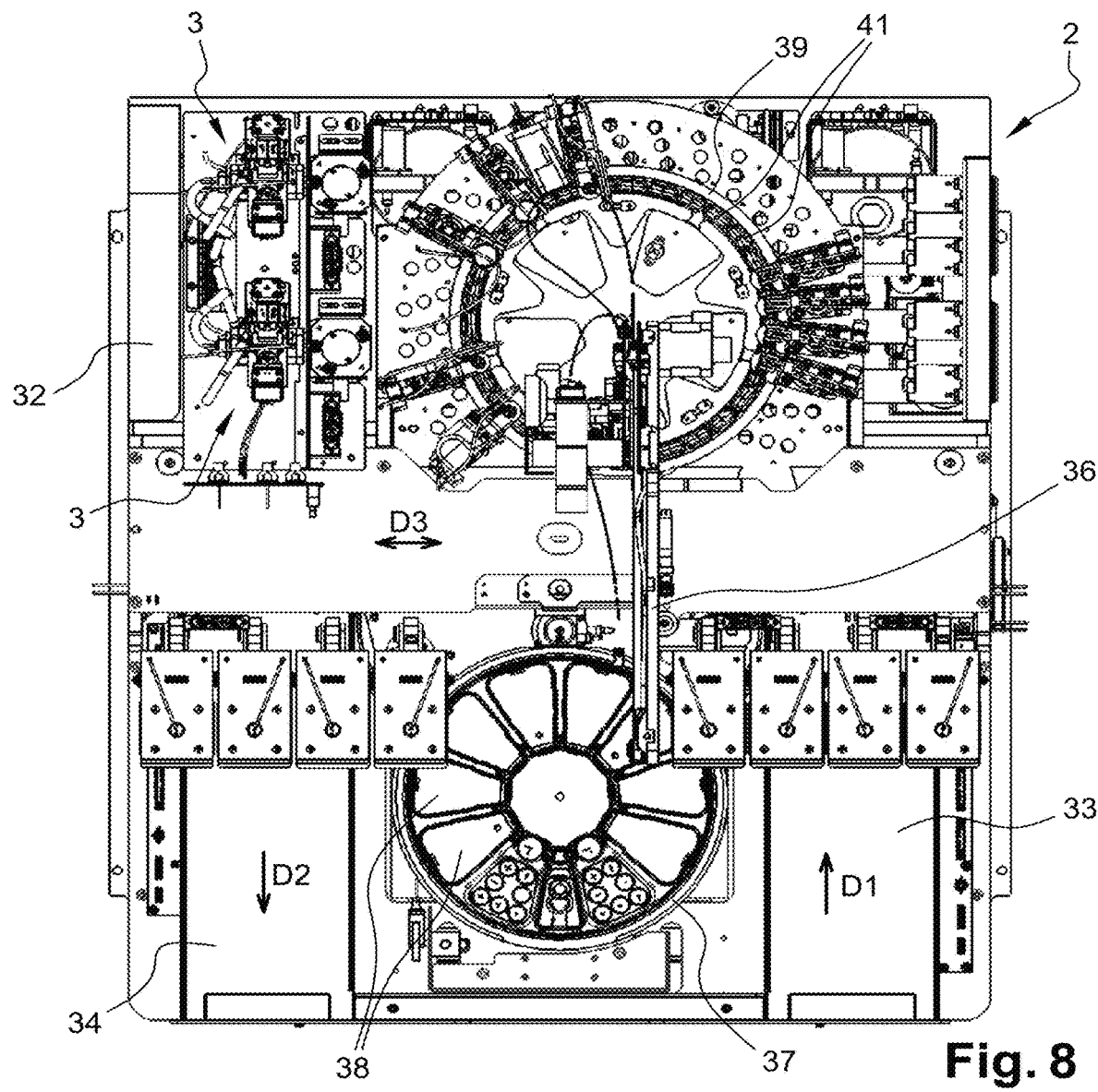
FIG. 8 is a top view of an analysis apparatus comprising the flow cytometer according to the present invention.

As shown in FIG. 8, the analysis apparatus 2 further comprises a processing unit 32 configured to analyze the cytometry parameters measured by the measuring means of the flow cytometer 3, and in particular to analyze the measurement signals provided by each detection element. The processing unit 32 is more particularly configured to differentiate and identify the biological cells of a biological sample to be analyzed, and in particular to determine the structure and shape of biological cells from the cytometry parameters measured by the measuring means. The processing unit 32 more particularly includes at least one electronic processing card equipped with a microprocessor.

As illustrated in FIG. 8, the analysis device 2 may comprise two flow cytometers 3, and also a loading module 33 arranged to displace at least one rack in a first direction of displacement D1, an unloading module 34 arranged to displace at least one rack in a second direction of displacement D2, a stirring module (not visible in FIG. 8) arranged to displace at least one rack between the loading module and the unloading module, the stirring module and the loading and unloading modules defining a generally U-shaped rack transport path. Advantageously, the analysis apparatus 2 also includes a sampling module 36 arranged to take samples of biological liquid in containers received in a rack positioned in the stirring module.

The analysis apparatus 2 can also comprise:
- a loading rotor 37 disposed between the loading and unloading modules and with a substantially vertical axis of rotation, the loading rotor 37 comprising a plurality of housings 38 capable of receiving containers containing samples of biological fluid to be analyzed or reactive products and in particular capable of receiving cartridges to carry out configurable therefore immuno-hematology but also immunology tests on whole blood, the collection module 36 being arranged to take samples or reactive products from the containers received in the loading rotor 37,
- rotational drive means associated to the loading rotor 37 and arranged to drive in rotation the loading rotor 37 about the axis of rotation thereof.
- a preparation rotor 39 with a substantially vertical axis of rotation, the preparation rotor 39 comprising a plurality of preparation cuvettes 41, the sampling module 36 being arranged to supply the preparation cuvettes 41 with samples of biological fluid or with reactive products which are previously taken, and
- rotational drive means associated to the preparation rotor 39 and arranged to drive in rotation the preparation rotor 39 about the axis of rotation thereof.

The presence of cartridges on the loading rotor 37 allows adding additional preparation reagents, and therefore adding, to the measurements of cytometry parameters of a physical or morphological nature, measurements of cytometry parameters of an immuno-hematological nature.

Furthermore, the analysis apparatus 2 can be provided, at the preparation rotor 39, with a magnetic device which allows capturing magnetic particles in solutions. These magnetic particles are covered with antibodies allowing selectively capturing certain type of cells, for example all leukocytes. Thus, after resuspension in an isotonic diluent, the prepared biological sample contains only leukocytes without having had to use lysis to destroy the red blood cells which are a thousand times more numerous. Therefore, the leukocytes are intact and it is then possible to adapt the dilution rates to be able to perform the measurements of the N cytometry parameters on a significant number of cells with the possibility of identifying few or rare cells. Moreover, the leukocytes can also be selectively labeled for a conventional immunological identification (for example T lymphocytes).

A method for analyzing a biological sample containing biological cells using a flow cytometer 2 according to the present invention will now be described.

Such an analysis process comprises the following steps:
- preparation of the biological sample to be analyzed, the preparation step comprising for example a step of diluting the biological sample to be analyzed, for example using an isotonic diluent, and/or a step of selective lysis of at least some of the biological cells contained in the biological sample to be analyzed, such as erythrocytes, and/or a step of labeling at least some of the biological cells contained in the sample biological to be analyzed with a fluorochrome,
- passage of the biological cells contained in the biological sample to be analyzed into the measurement chamber 7 of the flow cytometer 3,
- measurement of N cytometry parameters for each biological cell contained in the biological sample to be analyzed, such as cytometry parameters representative of the morphology and/or structure of the biological cells of the biological sample to be analyzed, using the flow cytometer 3,
- determination, for each biological cell of the biological sample to be analyzed, of a point in an N-dimensional space whose coordinates are defined depending on the cytometry parameters measured for said biological cell of the biological sample to be analyzed, each axis of coordinate of the N-dimensional space corresponding to a respective measured cytometry parameter or to a value calculated from said respective measured cytometry parameter,
- automatic clustering of the points relating to the biological sample to be analyzed in different cell clusters depending on the cytometry parameters measured for each biological cell of the biological sample to be analyzed, so as to define a sample cluster file, the sample cluster file being for example of the FCS (Flow Cytometry Standard) format,
- automatic identification of the cell populations defined by the different cell clusters of the sample cluster file,
- automatic counting of the points of each cell cluster of the sample cluster file,
- comparison of the sample cluster file with reference cluster files, each of the reference cluster files being defined from cytometry parameters of a respective pathological or abnormal biological sample,
- emission of an alarm message when the sample cluster file is at least partially identical or similar to a reference cluster file, and in particular when predetermined cell clusters of the sample cluster file are identical or similar to predetermined cell clusters of the reference cluster file, the emitted alarm message advantageously containing indications relating to a pathology or an abnormality associated to the reference cluster file to which the sample cluster file is at least partially the identical or similar, the determination, clustering, comparison and emission steps being carried out by the processing unit 32.

Such an automatic clustering step can be carried out in different manners known to those skilled in the art, and is therefore not described in detail in the present description.

According to one embodiment of the invention, the analysis method comprises a step of sampling and digitizing a set of analog signals generated during the duration of the measurement step so as to define a first digitized raw data file for each of the N measurement channels, and a step of synchronizing and clustering the N digitized signals for each biological cell of the sample to be analyzed by a first level of computer processing. Said sampling and digitization step is carried out by the processing unit 32 which transmits the files by Ethernet link to a PC type computer unit (not represented in FIG. 8) which analyzes them.

According to an embodiment of the analysis method, the latter further comprises a step of analyzing the sample cluster file so as to detect at least one possible anomaly in the sample cluster file, the analysis step being carried out by the processing unit 32. Advantageously, the comparison step is carried out only when at least one anomaly is detected during the analysis step and the alarm message emitted during the transmission step then also contains information relating to the at least one detected anomaly. These arrangements allow, on the one hand, avoiding carrying out the comparison step if the biological sample to be analyzed is normal and not pathological, and therefore reducing the time of execution of the calculations and providing more quickly the results of the analysis to the operator, and on the other hand, communicating to the operator an alarm message as detailed as possible when the biological sample to be analyzed is pathological or abnormal.

The analysis step advantageously comprises the following steps:
  analysis, for each cell cluster of the sample cluster file, of at least one morphological parameter of said cell cluster, such that the positioning of said cell cluster, the distribution of the points of said cell cluster, the number of points of said cell cluster, and/or the presence or absence of said cell cluster,
  detection of an anomaly if at least one morphological parameter of at least one cell cluster of the sample cluster file exceeds a respective predetermined threshold value.

According to one embodiment of the invention, the analysis step more particularly comprises the following steps:
  comparison, for each cell cluster of the sample cluster file, of the number of points clustered in said cell cluster with at least one respective predetermined threshold value,
  analysis of the distribution of the points in each cell cluster of the sample cluster file,
  analysis of the positioning of the cell clusters of the sample cluster file,
  analysis of the presence and/or absence of at least certain predetermined cell clusters,
  detection of an anomaly if the distribution of the points in at least one of the cell clusters is not Gaussian,
  detection of an anomaly if at least two cell clusters of the sample cluster file are at least partially confused,
  detection of an anomaly if the presence or absence of at least one predetermined cell cluster is detected,
  detection of an anomaly if the number of cell clusters is greater or less than a predetermined reference value,
  detection of an anomaly if the number of points clustered in at least one of the cell clusters is below and/or greater than a respective predetermined threshold value.

According to one embodiment of the invention, the analysis step comprises a step of comparing the sample cluster file with normal cluster files, each of the normal cluster files being defined from cytometry parameters of a respective normal biological sample. These arrangements allow in particular facilitating the detection of an anomaly in the sample cluster file.

According to one embodiment of the invention, the step of measuring cytometry parameters includes the following steps:
  emission, using the emission device 22, of an incident light beam towards the biological cells passing through the measurement chamber 7 such that the incident light beam crosses the path of the biological cells,
  detection, using collection devices 23a-23c, of different light beams from each biological cell passing through the measurement chamber 7.

Given the configuration and the arrangement of the different collection devices 23a-23c, the step of measuring cytometry parameters comprises in particular the following steps:
  measurement of the intensity of the light beams scattered at small angles by each biological cell using the collection optical fibers 25b, 25c of the collection device 23a,
  measurement of the intensity of a light beam scattered along the optical path of the incident light beam by each biological cell using the central collection optical fiber 25a of the collection device 23a,
  measurement of the intensity of a light beam scattered at 90° by each biological cell using the collection device 23b, and
  measurement of the intensity of a fluorescence beam emitted at 90° by each biological cell using the collection device 23c.

Advantageously, the step of measuring cytometry parameters further comprises a step of measuring the variation in electrical impedance generated by the passage of the biological cells through the measurement chamber 7, using the electrical impedance variation measurement device.

Advantageously, the analysis method comprises the initial following steps:
  measuring cytometry parameters for each biological cell contained in a reference biological sample using the flow cytometer 3,
  determining, for each biological cell of the reference biological sample, a point in an N-dimensional space whose coordinates are defined depending on the cytometry parameters measured for each biological cell of the reference biological sample, each coordinate axis of the N-dimensional space corresponding to a respective measured cytometry parameter,
  automatic clustering of the points relating to the reference biological sample into different cell clusters depending on the cytometry parameters measured for each biological cell of the reference biological sample, so as to define a reference cluster file, each reference cluster file being for example in the FCS (Flow Cytometry Standard) format, the determination and clustering steps being carried out by the processing unit 32, repeating said initial measurement, determination and clustering steps for a plurality of reference biological samples so as to define a plurality of reference cluster files.

Of course, the invention is not limited to the only embodiment of the flow cytometer and to the only embodiments of the analysis method, described above by way of examples, it encompasses on the contrary all variants thereof.

The invention claimed is:

1. An analysis method for analyzing a biological sample containing biological cells including blood cells, the analysis method comprising the following steps:
    passage of the biological cells of the biological sample to be analyzed into a measuring cell of a flow cytometer,
    measurement of N cytometry parameters for each biological cell of the biological sample to be analyzed,
    determination, for each biological cell of the biological sample to be analyzed, of a point in a N-dimensional space whose coordinates are defined depending on the cytometry parameters measured for the corresponding biological cell, where N is an integer greater than or equal to 3,
    automatic clustering of the determined points into different cell clusters depending on the measured cytometry parameters, so as to define a sample cluster file,
    identification of cell populations defined by the different cell clusters of the sample cluster file,
    counting of the points of each cell cluster of the sample cluster file,
    analysis of the sample cluster file so as to detect at least one possible anomaly in the sample cluster file, wherein the analysis step comprises analysis of each cell cluster of the sample cluster file and detection of an anomaly if the presence or absence of at least one predetermined cell cluster is detected,
    comparison of the sample cluster file with reference cluster files, each of the reference cluster files being defined from cytometry parameters of a respective pathological or abnormal biological sample.

2. The analysis method according to claim 1, which further comprises a step of emitting an alarm message when the sample cluster file is at least partially identical or similar to a reference cluster file.

3. The analysis method according to claim 2, wherein the emitted alarm message contains indications related to a pathology or an abnormality associated to the reference cluster file to which the sample cluster file is at least partially identical or similar.

4. The analysis method according to claim 1, wherein the comparison step is carried out only when at least one anomaly is detected during the analysis step.

5. The analysis method according to claim 1, wherein the analysis step comprises the following steps:
    analysis, for each cell cluster of the sample cluster file, of at least one morphological parameter of said cell cluster,
    detection of an anomaly if at least one morphological parameter of at least one cell cluster of the sample cluster file exceeds a respective predetermined threshold value.

6. The analysis method according to claim 1, wherein the analysis step comprises the following steps:
    comparison, for each cell cluster of the sample cluster file, of a number of points clustered in each cell cluster of the sample cluster file with at least one respective predetermined threshold value,
    detection of an anomaly if the number of points clustered in at least one cell cluster of the sample cluster file is less and/or greater than the at least one respective predetermined threshold value.

7. The analysis method according to claim 1, wherein the analysis step comprises the following steps:
    analysis of a distribution of the points in each cell cluster of the sample cluster file,
    detection of an anomaly if the distribution of the points in at least one cell cluster of the sample cluster file is not Gaussian.

8. The analysis method according to claim 1, wherein the analysis step comprises the following steps:
    analysis of the positioning of each cell cluster of the sample cluster file,
    detection of an anomaly if at least two cell clusters of the sample cluster file are at least partially confused.

9. The analysis method according to claim 1, wherein the step of measurement of N cytometry parameters comprises at least one step of measuring cytometry parameters representative of a morphology and/or a structure of each biological cell of the biological sample to be analyzed.

10. The analysis method according to claim 9, wherein the step of measurement of N cytometry parameters comprises at least one step of measuring, for each biological cell of the biological sample to be analyzed, at least one optical property of said biological cell.

11. The analysis method according to claim 10, wherein the step of measurement of N cytometry parameters comprises:
    a step of measuring the an intensity of a light beam scattered at small angles by each biological cell of the biological sample to be analyzed, and/or
    a step of measuring an intensity of a light beam scattered at 90° by each biological cell of the biological sample to be analyzed, and/or
    a step of measuring an intensity of a light beam scattered along an optical path of an incident light beam by each biological cell of the biological sample to be analyzed.

12. The analysis method according to claim 10, wherein the step of measurement of N cytometry parameters comprises a step of measuring an intensity of at least one fluorescence beam emitted by each biological cell of the biological sample to be analyzed, at 90°.

13. The analysis method according to claim 1, wherein the step of measurement of N cytometry parameters includes the following steps:
    emission of an incident light beam towards biological cells passing through a measurement chamber such that the incident light beam crosses a path of the biological cells passing through the measurement chamber,
    detection of at least one light beam from each biological cell passing through the measurement chamber.

14. The analysis method according to claim 1, which further comprises the following steps:
    passage of biological cells of a reference biological sample into a measuring cell of a flow cytometer,
    measurement of N cytometry parameters for each biological cell of the reference biological sample,
    determination, for each biological cell of the reference biological sample, of a point in a N-dimensional space whose coordinates are defined depending on the cytometry parameters measured for said biological cell of the reference biological sample, where N is an integer greater than or equal to 3,
    automatic clustering of the determined points relating to the reference biological sample into different cell clusters depending on the cytometry parameters measured for each biological cell of the reference biological sample, so as to define a reference cluster file, repeating said passage, measurement, determination and clustering steps for a plurality of reference biological samples so as to define a plurality of reference cluster files.

15. An analysis apparatus comprising:

a flow cytometer comprising a measurement cell intended for the passage of biological cells of a biological sample to be analyzed and measuring means configured to measure cytometry parameters of the biological cells of the biological sample to be analyzed, and a processing unit configured to:

determine, for each biological cell of the biological sample to be analyzed, a point in a N-dimensional space whose coordinates are defined depending on the cytometry parameters measured for the corresponding biological cell, where N is an integer greater than or equal to 3, cluster the points into different cell clusters depending on the cytometry parameters measured for each biological cell of the biological sample to be analyzed, so as to define a sample cluster file, perform an analysis action on the sample cluster file so as to detect at least one possible anomaly in the sample cluster file, wherein the analysis action comprises analyzing the cell clusters of the sample cluster file and detecting an anomaly if the presence or absence of at least one predetermined cell cluster is detected, compare the sample cluster file with reference cluster files, each of the reference cluster files being defined from cytometry parameters of a respective pathological or abnormal biological sample.

16. An analysis method for analyzing a biological sample containing biological cells including blood cells, the analysis method comprising the following steps:

passage of the biological cells of the biological sample to be analyzed into a measuring cell of a flow cytometer, measurement of N cytometry parameters for each biological cell of the biological sample to be analyzed, determination, for each biological cell of the biological sample to be analyzed, of a point in a N-dimensional space whose coordinates are defined depending on the cytometry parameters measured for the corresponding biological cell, where N is an integer greater than or equal to 3, automatic clustering of the determined points into different cell clusters depending on the measured cytometry parameters, so as to define a sample cluster file, identification of cell populations defined by the different cell clusters of the sample cluster file, counting of the points of each cell cluster of the sample cluster file, analysis of the sample cluster file so as to detect at least one possible anomaly in the sample cluster file, comparison of the sample cluster file with reference cluster files, each of the reference cluster files being defined from cytometry parameters of a respective pathological or abnormal biological sample, wherein the comparison step is carried out only when the at least one possible anomaly is detected during the analysis step.

17. An analysis method for analyzing a biological sample containing biological cells including blood cells, the analysis method comprising the following steps:

passage of the biological cells of the biological sample to be analyzed into a measuring cell of a flow cytometer, measurement of N cytometry parameters for each biological cell of the biological sample to be analyzed, determination, for each biological cell of the biological sample to be analyzed, of a point in a N-dimensional space whose coordinates are defined depending on the cytometry parameters measured for the corresponding biological cell, where N is an integer greater than or equal to 3, automatic clustering of the determined points into different cell clusters depending on the measured cytometry parameters, so as to define a sample cluster file, identification of cell populations defined by the different cell clusters of the sample cluster file, counting of the points of each cell cluster of the sample cluster file, comparison of the sample cluster file with reference cluster files, each of the reference cluster files being defined from cytometry parameters of a respective pathological or abnormal biological sample, and emitting an alarm message when the sample cluster file is at least partially identical or similar to a reference cluster file.

\* \* \* \* \*